E. J. PRINDLE.
LAST AND SHOE TREEING MACHINE.
APPLICATION FILED OCT. 22, 1910.

1,030,206.

Patented June 18, 1912.

2 SHEETS—SHEET 1.

WITNESSES.

INVENTOR.

E. J. PRINDLE.
LAST AND SHOE TREEING MACHINE.
APPLICATION FILED OCT. 22, 1910.
1,030,206.
Patented June 18, 1912.
2 SHEETS—SHEET 2.
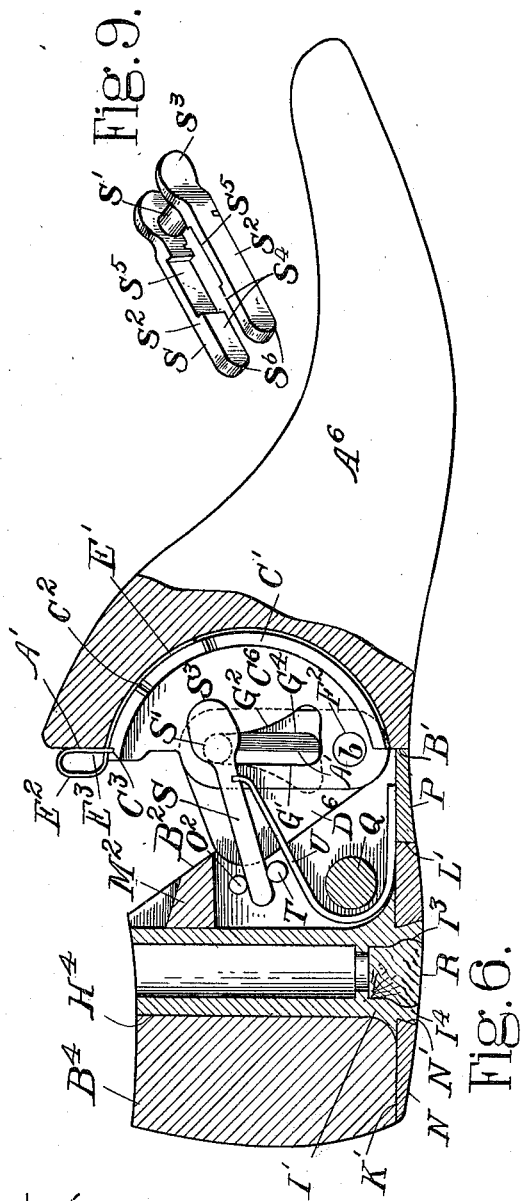
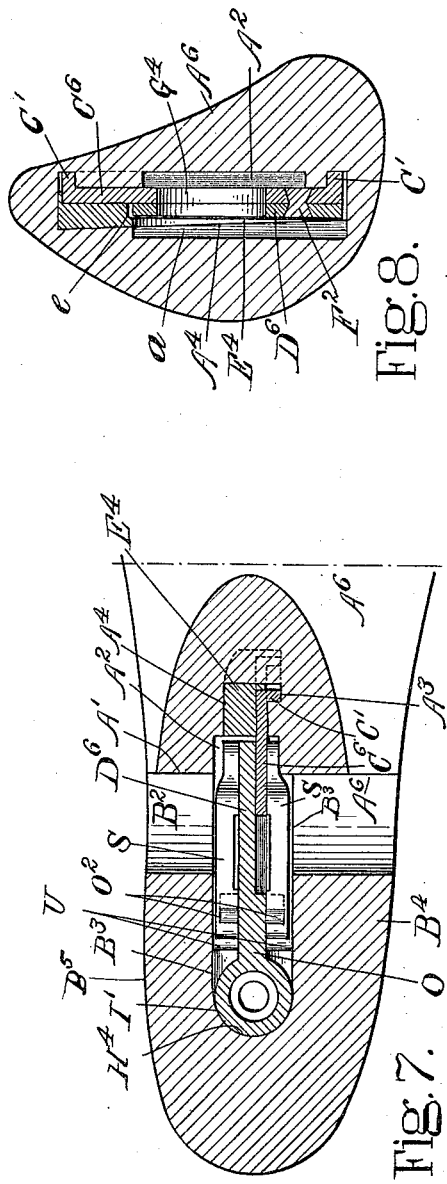
WITNESSES.
INVENTOR.
COLUMBIA PLANOGRAPH CO., WASHINGTON, D. C.

UNITED STATES PATENT OFFICE.

EDWIN J. PRINDLE, OF EAST ORANGE, NEW JERSEY, ASSIGNOR TO UNITED SHOE MACHINERY COMPANY, OF PATERSON, NEW JERSEY, A CORPORATION OF NEW JERSEY.

LAST AND SHOE-TREEING MACHINE.

1,030,206.  Specification of Letters Patent.  Patented June 18, 1912.

Application filed October 22, 1910. Serial No. 588,516.

*To all whom it may concern:*

Be it known that I, EDWIN J. PRINDLE, of No. 36 Midland avenue, East Orange, in the county of Essex and in the State of New Jersey, have invented a certain new and useful Improvement in Lasts and Shoe-Treeing Machines, and do hereby declare that the following is a full, clear, and exact description thereof.

The object of my invention has been to provide a tree leg for use with detachable fore-parts of lasts, and to such ends, my invention consists in the improvement in tree legs as hereinafter specified.

Figure 1:
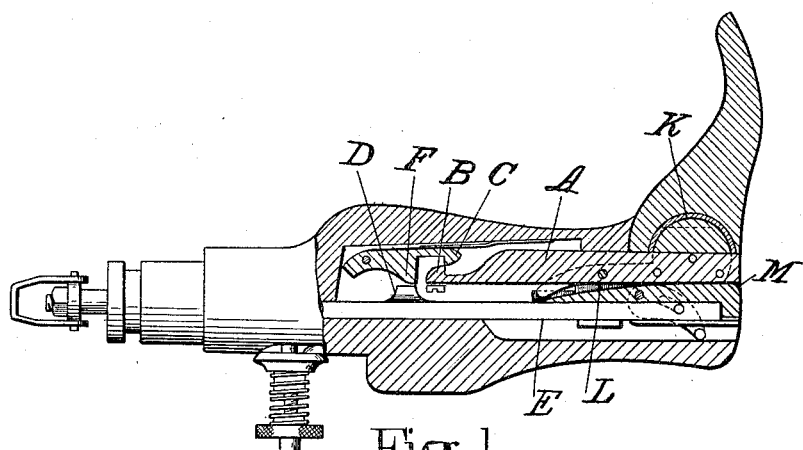
Figure 4:
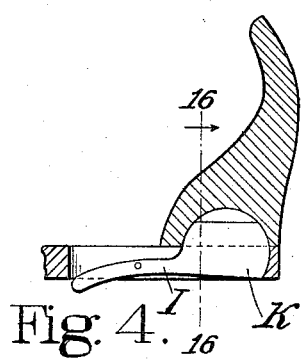
Figure 3:
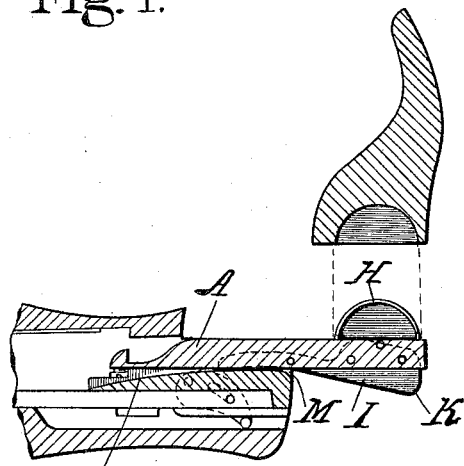
Figure 5:
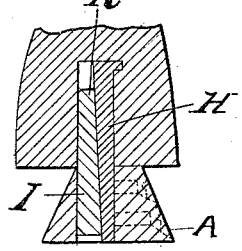
Figure 2:
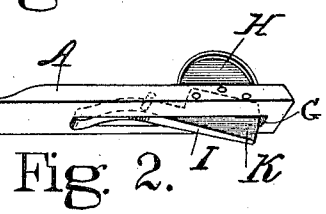

In the accompanying drawings, Figure 1 is a side elevation, partly in section, of a boot-tree leg for use with the fore-part of the last illustrated in my Patent No. 648,525, May 1st, 1900; Fig. 2 is a perspective view of the bar on which the said fore-part is fastened; Fig. 3 is a sectional view of the lower part of Fig. 1, showing the fore-part disengaged from the tree-leg; Fig. 4 is a sectional view, showing the fore-part secured to the parts which hold it on the tree-leg; and Fig. 5 is an enlarged sectional view taken on the line 16—16 of Fig. 4. Figs. 6, 7 and 8 are sectional views of a last constructed in accordance with the patent above designated and Fig. 9 is a perspective view of the locking part of said last.

In the patent granted to me May 1st, 1900, No. 648,525, is illustrated a last, the fore-part of which is readily detachable, one object of the invention being to provide a last in which fore-parts of various styles can be used with a standard heel and hinge, so that, in introducing a new style of last, the manufacturer is not put to the expense of procuring new heel-parts and hinges, but is required only to procure fore-parts of the styles desired, and can use them upon heel-parts and hinges already manufactured.

It is the purpose of the invention to provide a tree leg upon which the interchangeable and readily detachable fore-parts illustrated in the said patent can be used, so that the hitherto great expense of having specially made tree feet for each new last is avoided.

The last of the said patent is shown in Figs. 6 to 9, inclusive, and such last is constructed as follows:—It is divided so that the fore-part $A^6$ has a rear face $A'$, the plane of which is preferably perpendicular to the length of the last. The heel part $B^4$ has a short vertical face $B'$ at its front lower portion, which face when the last is extended abuts against the rear face $A'$ of the fore-part $A^6$, and the front face $B^2$ of the heel part above the short vertical face inclines backward and upward in a transverse plane. The connection I employ between the fore and heel parts consists of two substantially vertical longitudinal plates, one of which, $C^6$, is attached to the fore-part and extends across the recess between the fore and heel parts and preferably, although not necessarily, into a slot $B^3$ in the heel part, and the other of which plates $D^6$ is secured to the heel part $B^4$, overlaps the fore-part plate C, and preferably, although not necessarily, extends into a slot $A^2$ in the fore-part.

To attach the fore-part plate $C^6$ to the fore-part, said plate is provided with an arc-shaped flange $C'$ on its outer face— *i. e.*, the face opposite to the heel part plate— and this flange $C'$ fits into an arc-shaped groove $A^3$, formed in the wall of a slot $A^2$ in the fore-part $A^6$. Teeth $C^2$ and $C^2$, formed on the arc-shaped flange $C'$ bite into the wood in the groove $A^3$ and prevent the flange from turning in the groove. The plate $C^6$ is held with the flange $C'$ in the groove $A^3$ by a wedge $E^4$, that also occupies the slot $A^2$ and that is semicircular in form and tapers from top to bottom and from the rear edge toward the front, although it is not necessary to have it taper in both these directions. The wall $A^4$ of the slot $A^2$ in the fore-part is inclined to fit the wedge $E^4$ and is cut out at $a$ to permit sufficient lateral movement of the heel part plate, so that the arc-shaped flange on the fore-part plate can enter the slot $A^2$ until it is opposite the arc-shaped groove $A^3$. The opposite wall of the slot $A^2$ and the wedge $E^4$ are cut out to permit proper movement of the enlarged ends of the arms on the locking-piece. The wedge $E^4$ is also recessed at $e$ to permit movement of the heel part plate. This wall $A^4$ might be cut to form a spiral surface, such as is formed on a screw. The wedge $E^4$ is provided along its upper circular edge with a flange $E'$, that fits over the circular edge of the fore-part hinge-plate $A^6$, and this flange $E'$ is at its outer end bent up into a spring-handle $E^2$, a portion of whose free end $E^3$ engages a notch $C^3$ in the fore-part hinge-plate $C^6$, thus locking the wedge $E^4$ in place and through it the fore-part hinge-plate $C^6$. The wedge $E^4$ can be inserted and removed by hand, thus providing convenient means for readily removing one fore-part and substituting another.

The fore-part plate $A^6$ is hinged to the heel-part plate $D^6$ by a rivet $F^2$, which occupies oppositely-countersunk holes in said plates, its ends being preferably flush with the outer faces of said plates, as shown in Fig. 6. Each of these plates $C^6$ and $D^6$ is provided with a slot $G^4$ above the hinge, each of which slots $G^4$ and $G^4$ has a straight wall $G'$ on the side toward the outer edge of the plate and an opposite wall $G^2$, that is straight at the top only for a very short distance, from which point it sweeps out in a compound curve or in an oblique line, as preferred, and around to the straight wall.

In the heel part a vertical hole $H^4$ is bored to receive the jack-pin socket $I'$. A horizontal and a vertical saw-cut $K'$ and $L'$ are made, thus removing material to form a socket for the anvil heel seat N, and a vertical slot $B^3$ is made from the jack-pin-socket hole $H^4$ forward to the front face $B'$ of the heel part, but leaving a portion $M^2$, of wood, uniting the two sides of the heel-part at its front upper corner. The heel-part plate $D^6$, jack-pin socket $I'$, and the anvil heel seat N are all preferably formed in one piece and when so made are formed, preferably, by forging. Back of the portion where the fore-part plate overlaps the heel-part plate the forging is made as thick as the two plates together, thus forming a web O, uniting the heel-part plate to the jack-pin socket. The web O is extended down to the top of the anvil-heel seat N. A block P on the web fills the slot from the front wall of the anvil-heel seat N to the vertical wall $B'$ of the heel part. A pin of wood Q is glued into holes in the parts $B^4$ and $B^5$ of the heel part, which are separated by the slot $B^3$ in the heel part, and this pin passes through an alined hole in the web O. The pin Q fastens the forging in the heel part and firmly unites the wood of the front lower portions of the heel part $B^4$ where they are separated by the web O. The anvil-heel seat N is formed separately from the jack-pin socket $I'$, so that such heel seats of different sizes and styles can be used with the same hinge mechanism. The jack-pin socket $I'$ is formed with a flaring portion $I^4$ near its lower end, which portion forms a shoulder, against which the anvil-heel seat N can firmly rest. Below the flaring portion $I^4$ of the jack-pin socket $I'$ is a cylindrical portion at the lower end of which is an annular lip $I^3$. The anvil-heel seat N is provided with a circular countersunk hole $N'$. In fastening the anvil-heel seat it is placed over the lower cylindrical end of the jack-pin socket $I'$ and against the shoulder formed by the flaring portion $I^4$. The lower end of the jack-pin socket $I'$ is then expanded or upset in the countersunk hole $N'$, in the anvil-heel seat N. To provide for the heel-tack of the insole, a plug of wood R is dropped into the lower end of the anvil-heel seat N and is fastened in place by turning the annular lip $I^3$ before mentioned. The web O affords a support for the front portion of the anvil-heel seat N, and the block P prevents its turning on the jack-pin socket $I'$.

A locking piece S occupies the slots $G^4$ and $G^4$ in the fore and heel-part plates $C^6$ and $D^6$ and serves to lock the parts $A^6$ and $B^4$ of the last both against strains tending to collapse the last and against strains tending to move the said parts away from each other beyond their normal position. The locking-piece also acts to extend the last. Said locking piece S consists of a preferably cylindrical pin $S'$, occupying the slots $G^4$ and $G^4$ in the fore and heel part plates and connecting two parallel arms $S^2$ and $S^2$, which are enlarged at their forward ends $S^3$. The fore part $A^6$ is cut out at each side of the slot $A^2$ to allow the locking-piece arms $S^2$ to play. The arms $S^2$ are for the purpose of affording convenient means to move the locking-pin $S'$, and for that purpose such arms $S^2$ are most conveniently maintained in a substantially-horizontal position. The side faces $S^4$ of the arms $S^2$ are cut away at their middle portions $S^5$ to reduce the friction on the plates. The rear ends $S^6$ of the arms $S^2$ play between alined lugs $O^2$ and $O^2$, formed on opposite sides of the web O, and the ends of a pin T, driven through a hole in the web O. The locking piece S is combined with the hinge plates $C^6$ and $D^6$ by holding it with its arms $S^2$ and $S^2$ extended upward and threading one arm $S^2$ through the superposed slots $G^4$ and $G^4$ in the plates $C^6$ and $D^6$, preferably before the rivet $F^2$ is put in place which forms the pivot of the hinge. The arms $S^2$ and $S^2$ of the locking-piece are then swung down to their normal position to rest on the lugs $O^2$ and $O^2$ on the web O, and the pin T is driven into the hole in the web. If the upper and lower surfaces of the arms $S^2$ and $S^2$ are parallel, the pin T and lugs $O^2$ and $O^2$ must be somewhat farther apart than the vertical thickness of the arms $S^2$ and $S^2$, but a close fit may be had by making the arms $S^2$ and $S^2$ elliptical in vertical cross-section.

It is desirable to have the last automatically lock itself. For this purpose, as well as to keep the locking piece in locked position while the last is in use, I provide elastic means which tend to raise the locking-piece to the top of the slots in the fore and heel-part plates. The particular means employed consists of a spring or springs U and U, preferably one on each side of the web, which rest on the block P at the bottom of the web O, extend in a curve around the wooden plug Q, and then extend forward and upward, where their upper ends are inserted in notches in the forward portions of the lower faces of the arms $S^2$ and $S^2$ of the locking pieces S.

The operation of the form of last shown in Figs. 6 to 9 is as follows:—In the normal position of the last, into which position the parts of the last are thrown by the spring, the locking-piece S, owing also to the action of the spring, is at the top of the slots $G^4$ and $G^4$. When it is desired to remove the last from a shoe, the locking-piece S is forced toward the hinge center $b$ against the action of the springs U and U and the fore and heel-parts $A^6$ and $B^4$ are swung toward each other, thus materially shortening the last, and the last is withdrawn from the shoe. As soon as the last is released the springs U and U throw the locking piece S upward, which latter by its action on the curved walls $G^2$ and $G^2$ of the slots $G^4$ and $G^4$ swings the fore and heel-part plates $C^6$ and $D^6$ apart and with them the fore and heel parts $A^6$ and $B^4$ and extends the last. The locking piece S then passes above the curved walls $G^2$ and $G^2$ and between the parallel straight walls, in which position it locks the last, thus automatically restoring it to proper position for having the parts of a shoe assembled thereon. If it is desired to insert the last into a finished or partly finished shoe, the locking piece S is forced far enough down in the slots $G^4$ and $G^4$—about half way—for the curved walls $G^2$ and $G^2$ to properly engage the pin $S'$ of the locking-piece S, when, if the heel part $B^4$ be thrown toward the fore-part $A^6$, the curved walls $G^2$ and $G^2$ will throw the pin $S'$ of the locking piece S the remainder of the distance to the bottom of the slots $G^4$ and $G^4$. The last being now collapsed can be inserted into the shoe. If the springs U and U should not be strong enough to raise the locking piece S and extend the last, a hook can be inserted into the recess between the fore and heel parts $A^6$ and $B^4$ and the locking piece S be raised, or pressure can be applied to the heel part $B^4$ to force it into extended position, and the springs U and U will raise the locking piece S to locking position during such movement of the heel part. When it is desired to detach the fore-part $A^6$, the end $E^3$ of the spring $E'$ on the wedge E, by means of the fingers applied to the handle $E^2$ on the wedge $E^4$ is raised out of the notch $C^3$ in the fore-part plate $C^6$ and the wedge $E^4$ is turned toward the heel part $B^4$ and about the center of the arc-shaped flange $C'$ until the flange $E'$ on the wedge $E^4$ is disengaged from the circular edge of the fore-part plate $C^6$, when the wedge $E^4$ can be lifted out of the slot $A^2$ in the fore-part $A^6$. The fore-part $A^6$ is now moved laterally until the arc-shaped flange $C'$ on the fore-part plate is disengaged from the arc-shaped groove $A^3$ in the fore-part slot $A^2$, when the fore-part $A^6$ can be moved forward until it is clear of the fore-part plate C. A reversal of these steps will fasten the fore-part on the fore-part plate.

The general construction of my tree leg is like that illustrated in the patent to Abel D. Tyler, No. 319,356, June 2nd, 1885; and my invention relates chiefly to means for securing the fore-part to the sliding bar A. Such bar is dove-tailed in cross-section, and is mounted in a dove-tailed guideway in the leg. The bar has a hook B upon its upper end which is adapted to be engaged by a hook C, pivoted in the leg, the hook being pressed toward the said bar by a spring in the leg. The hooks are disengaged by the action of a lug D on the operating bar E of the tree leg, which lug, when said operating bar is in the position in which the leg is contracted, engages a lug F on the hook C. The bar A is provided with a slot G in which is secured a plate H having an arc-shaped flange, the portion of such plate projecting beyond the bar A being of the same shape as the portion of the fore-part hinge plate in the last. A lever I is pivoted in the slot G, and the lower end of such lever carries a wedge K which is adapted to enter the slot in the fore-part and to secure the fore-part upon the plate H. The wedge K not only tapers from top to bottom, but preferably tapers forward, and the plate H is preferably thickened forward, so that as the wedge moves forward, its exposed side surface moves laterally and draws the fore-part securely against the exposed side surface of the plate H. The upper end of the lever I is curved rearward, and is adapted to ride on a cam surface L on the tree leg. The lower end of the lever is adapted to engage a corner M on the tree leg, and the combined action of the cam surface L and the corner M is such that, when the bar A is drawn downward from the leg, the wedge K is withdrawn from the slot in the fore-part, thus releasing the fore-part, and when the bar A is forced upward into the leg, the wedge is forced outward into the slot in the fore-part, thus securing the fore-part to the bar E.

In the operation of my tree leg, the fore-part is placed over the plate H, such plate being received in the slot on the fore-part.

The fore-part can either be in or out of the shoe at this time, and the bar A is drawn down, as shown in Fig. 3. The fore-part and the bar A are then slid upward to the position shown in Fig. 1, when the wedge K will be forced home in the slot in the fore-part and crowd the arc-shaped flange on the plate H into the arc-shaped groove in the slot in the fore-part and fasten the fore-part to the plate H. The shoe can now be treed in the manner usual with the operation of the Tyler tree leg. To facilitate taking off the shoe and putting on another shoe, without removing the fore-part, the fore-part and bar A can be drawn down, as shown in Fig. 3, so that the back of the leg, is in effect, drawn out of the shoe.

While I have described my invention above in detail, I wish it to be understood that many changes may be made therein without departing from the spirit of my invention.

I claim:—

1. The combination of a last having a detachable fore-part, and a boot tree leg having means for attaching said fore-part thereto.

2. The combination of a last having a detachable fore-part and a boot tree leg, having means for attaching said fore-part thereto, and having means whereby a movement of the back of the tree leg and the fore-part relative to each other can be produced while the fore-part is connected to the tree leg, which movement in one direction causes the back of the tree leg to be above the level of the counter of the shoe.

3. The combination of a last having a detachable fore-part, and a tree leg, means for detachably connecting said fore-part to said tree leg, and means whereby said fore-part and said connected tree part can be moved in a direction longitudinal of the leg.

4. The combination of a last having a detachable fore-part, and a tree leg, said tree leg having means for fastening said fore-part thereto, said means comprising a locking piece movable in a direction at an angle to the direction of movement in engaging said fore-part.

5. The combination of a last having a detachable fore-part, and a tree leg, said tree leg having means for fastening said fore-part thereto, said means comprising a locking piece movable in a direction perpendicular to the direction of movement in engaging said fore-part.

6. The combination of a last having a fore-part that is provided with a slot having a lateral offset, the hinge of the last having a lateral projection to engage said offset, and said last having a wedge to secure said projection in said offset, and a tree leg having a bar movable longitudinally of the tree leg, said bar being provided with a plate having a lateral projection that is adapted to engage said offset, and a wedge that is adapted to secure said projection in said offset, and means for causing said wedge to be moved into operative position as said bar is drawn toward said tree leg, and to be removed from said operative position as such bar is moved away from said tree leg.

7. The combination of a last having a detachable fore-part and a tree leg, means for detachably securing said fore-part upon said tree leg, and means whereby the back of said tree leg and said fore-part may be moved apart in the direction of the length of the shoe.

8. The combination of a heel-part, a toe-part, and means for detachably connecting said parts, a tree leg, and means for detachably connecting said toe-part with said tree leg.

9. The combination of a toe-part, a heel-part and means for detachably connecting said parts, whereby said parts may constitute a last, and a tree-leg having means for attaching said fore-part thereto, whereby said tree-leg, and toe-part may constitute a means for treeing the shoe.

In testimony that I claim the foregoing I have hereunto set my hand.

EDWIN J. PRINDLE.

Witnesses:
M. MEIKLE,
MINERVA LOBEL.